(12) United States Patent
Xiao

(10) Patent No.: US 9,986,148 B2
(45) Date of Patent: May 29, 2018

(54) IMAGE CAPTURING TERMINAL AND IMAGE CAPTURING METHOD

(71) Applicant: Yulong Computer Telecommunication Scientific (Shenzhen) Co., Ltd., Shenzhen, Guangdong (CN)

(72) Inventor: Lifeng Xiao, Guangdong (CN)

(73) Assignee: Yulong Computer Telecommunications Scientific (Shenzhen) Co., Ltd., Shenzhen, Guangdong (CN)

(*) Notice: Subject to any disclaimer, the term of this patent is extended or adjusted under 35 U.S.C. 154(b) by 0 days. days.

(21) Appl. No.: 15/314,417

(22) PCT Filed: Jan. 30, 2015

(86) PCT No.: PCT/CN2015/072005
§ 371 (c)(1),
(2) Date: Nov. 28, 2016

(87) PCT Pub. No.: WO2015/180510
PCT Pub. Date: Dec. 3, 2015

(65) Prior Publication Data
US 2017/0223256 A1    Aug. 3, 2017

(30) Foreign Application Priority Data
May 29, 2014  (CN) .......................... 2014 1 0236097

(51) Int. Cl.
H04N 5/232    (2006.01)
H04N 5/235    (2006.01)
H04N 5/225    (2006.01)

(52) U.S. Cl.
CPC ....... *H04N 5/23212* (2013.01); *H04N 5/2258* (2013.01); *H04N 5/2356* (2013.01)

(58) Field of Classification Search
CPC .......................... H04N 5/23212; H04N 5/2258
See application file for complete search history.

(56) References Cited

U.S. PATENT DOCUMENTS 5,831,671 A * 11/1998 Chigira ................ G02B 27/646
348/208.2
5,926,218 A    7/1999 Smith
(Continued)

FOREIGN PATENT DOCUMENTS

CN    103576416 A    2/2014
CN    103986876 A    8/2014
(Continued)

OTHER PUBLICATIONS

Extended European Search Report dated Dec. 12, 2017 in corresponding EP Application No. 15799671.1.

*Primary Examiner* — Ahmed A Berhan
(74) *Attorney, Agent, or Firm* — Young Basile Hanlon & MacFarlane, P.C.

(57) ABSTRACT

Provided is an image capturing method and an image capturing terminal. The terminal includes a first camera module, a second camera module, and a processing module. The first camera module and the second camera module are used for framing concurrently a same scene. The resolution of an image outputted by the first camera module is greater than the resolution of an image outputted by the second camera module. The processing module detects and analyzes on the basis of the contrast ratios of different frames of images, and controls the second camera to automatically focus on a determined focus. The processing module also is used for determining a focus for the first camera module on the basis of focus information of the second camera module, controlling the first camera module to focus directly on the basis of the determined focus and to capture an image while focused on the focus.

19 Claims, 2 Drawing Sheets

(56) References Cited

U.S. PATENT DOCUMENTS

| | | |
|---|---|---|
| 8,289,377 B1 | 10/2012 | Tsai et al. |
| 2006/0119710 A1* | 6/2006 | Ben-Ezra .................. G06T 5/50 348/208.99 |
| 2006/0221227 A1 | 10/2006 | Chang |
| 2010/0315539 A1* | 12/2010 | Azuma .............. H04N 5/23232 348/265 |
| 2012/0057065 A1 | 3/2012 | Tanaka |
| 2013/0027606 A1* | 1/2013 | Voss ..................... H04N 5/2258 348/349 |
| 2014/0071330 A1 | 3/2014 | Zhang et al. |

FOREIGN PATENT DOCUMENTS

| | | |
|---|---|---|
| CN | 103986877 A | 8/2014 |
| KR | 1020110015208 A | 2/2011 |

* cited by examiner

IMAGE CAPTURING TERMINAL AND IMAGE CAPTURING METHOD

CROSS-REFERENCE TO RELATED APPLICATION(S)

This present application claims the benefit of priority to China Patent Application No. 201410236097.6, filed in Chinese Patent Office on May 29, 2014, and entitled "IMAGE CAPTURING TERMINAL AND IMAGE CAPTURING METHOD", the content of which is hereby incorporated by reference in its entirety.

TECHNICAL FIELD

The present invention relates to the field of terminal shooting, and more particularly, to an image capturing terminal and an image capturing method, which can achieve quick autofocus.

BACKGROUND

Autofocus can be realized by using the principle of light reflection on an object, and accepting reflected light from the object by a sensor CCD (charge-coupled device) of a camera, and driving an electric focusing device to automatically focus under the control of a computer. A focusing method by using contrast ratio can realize autofocus by detecting the contour edge of an image. The more clearer the contour edge of the image is, the greater the brightness gradient is, or the greater the contrast ratio between the edge and the background of the image is. On the contrary, the contour edge of an out-of-focus image blurs, and the brightness gradient or the contrast ratio descends. The farther the out-of-focus is, the lower the contrast ratio is.

An existing single-camera focusing system can realize autofocus on the basis of a VCM (voice coil motor) gradually moving from an initial focus to a far focus, comparing the data of focusing window areas between different frames, finding the clearest point, and then completing the focusing process. However, under the condition of continuous improvement of the resolution of a terminal camera such as a mobile phone camera, the terminal camera generally outputs an image in the form of full resolution while previewing the image, realizing zero delay function, therefore, the frame rate is lower. For example, the resolution of an existing camera is about 20 MP, but the frame rate of the camera is only 12 fps when the camera outputs an image in form of full resolution. Moreover, under low illumination environment, general processing on the image is to reduce the frame rate to obtain higher image brightness and lower noise. Therefore, the existing frame detection contrast ratio method has the disadvantage of poor performance, longer focus time and slower focus speed under the condition of previewing images in the form of full resolution by the single-camera and lower light environment, thus resulting in affecting the user experience.

Therefore, how to provide an image capturing terminal and an image capturing method for achieving quick autofocus, is a technical problem to be solved for the persons having ordinary skill in the art.

SUMMARY

To solve the above problems, the present disclosure aims to provide an image capturing terminal and an image capturing method, so as to solve the problem of lower focus speed in the existing technology.

In order to achieve the above purpose, the present disclosure provides an image capturing terminal and an image capturing method.

An image capturing terminal includes a first camera module, a second camera module and a processing module; the first camera module and the second camera module are configured to frame concurrently the same scene, wherein, the resolution of an image outputted by the first camera module is greater than the resolution of an image outputted by the second camera module; the processing module is configured to detect and analyze on the basis of the contrast ratios of different frames of images and control the second camera module to automatically focus on a determined focus; and the processing module is further configured to determine a focus for the first camera module on the basis of focus information of the second camera module, and control the first camera module to focus directly on the basis of the determined focus and to capture an image while focused on the focus.

In the technical solution, the first camera module includes a first lens, a first actuator and a first image sensor; the second camera module includes a second lens, a second actuator and a second image sensor; the second actuator is configured to drive the second lens to move relative to the second image sensor to realize autofocus under the control of the processing module; and the processing module is configured to control the first actuator to directly drive the first lens to move to the focus according to position information of the focus of the second camera module.

In the technical solution, the first lens is the same as the second lens, and the first image sensor is the same as the second image sensor.

In the technical solution, when the first lens is located at the focus, and the second lens is located at the focus, the distance between the first lens and the first image sensor is equal to the distance between the second lens and the second image sensor.

In the technical solution, the first lens is the same as the second lens, and the physical resolution of the first image sensor is greater than the physical resolution of the second image sensor.

In the technical solution, each focus of the first camera module corresponds to the focus of a second camera module, and the focus of the first camera module is determined according to the focus of the second camera module and a corresponding relationship between the focus of the first camera module and the focus of the second camera module.

In the technical solution, the second actuator is a closed-loop motor, and the second actuator is further configured to sense the position information of the focus of the second camera module and send the position information of the focus to the processing module.

In the technical solution, the first actuator is a closed-loop motor or a voice coil motor.

In the technical solution, the frame rate of an image outputted by the second camera module is greater than the frame rate of an image outputted by the first camera module.

An image capturing method applied to an image capturing terminal includes a first camera module and a second camera module; the image capturing method includes:

controlling the first camera module and the second camera module to frame concurrently the same scene; wherein, the resolution of an image outputted by the first camera module is greater than the resolution of an image outputted by the second camera module;

controlling the second camera module to automatically focus on a focus and obtaining position information corresponding to the focus of the second camera module;

determining a focus for the first camera module on the basis of focus information of the second camera module; and controlling the first camera module to focus and capturing an image while focused on the focus.

The image capturing method and terminal provided in the present disclosure employ a first camera module and a second camera module to frame concurrently the same scene; the resolution of the image outputted by the first camera module is greater than the resolution of the image outputted by the second camera module. Because the second camera module outputs the image using a lower resolution, thus the second camera module has a high frame rate. When contrast ratio detection based on frame difference is used to achieve autofocus, the second camera module can find the focus in the condition of a higher frame rate, compared with the first camera module outputting the image with high resolution for autofocus, which can improve the speed of focus. The first camera module can directly realize autofocus on the basis of the focus information of the second camera module. Thus, by means of the technical solution of the present disclosure, the image capturing method and terminal can quickly obtain and capture the focus through the second camera module, and output the images with a higher resolution through the first camera module, which can guarantee the output of high resolution images, and have a shorter autofocus time at the same time, thereby improving the speed of autofocus and enhancing the user experience.

DETAILED DESCRIPTION

In order to illustrate the embodiments or existing technical solutions more clearly, a brief description of drawings that assists the description of embodiments of present disclosure or existing art will be provided below. It should be noted that, in the case of no conflict, the embodiments of the present disclosure and the features of each embodiment can be combined mutually. The invention will now be described in detail on the basis of preferred embodiments and drawings. It is to be understood that various changes may be made without departing from the spirit and scope of the disclosure and the embodiments of the present disclosure and features in the embodiments can be combined with each other.

Figure 1:
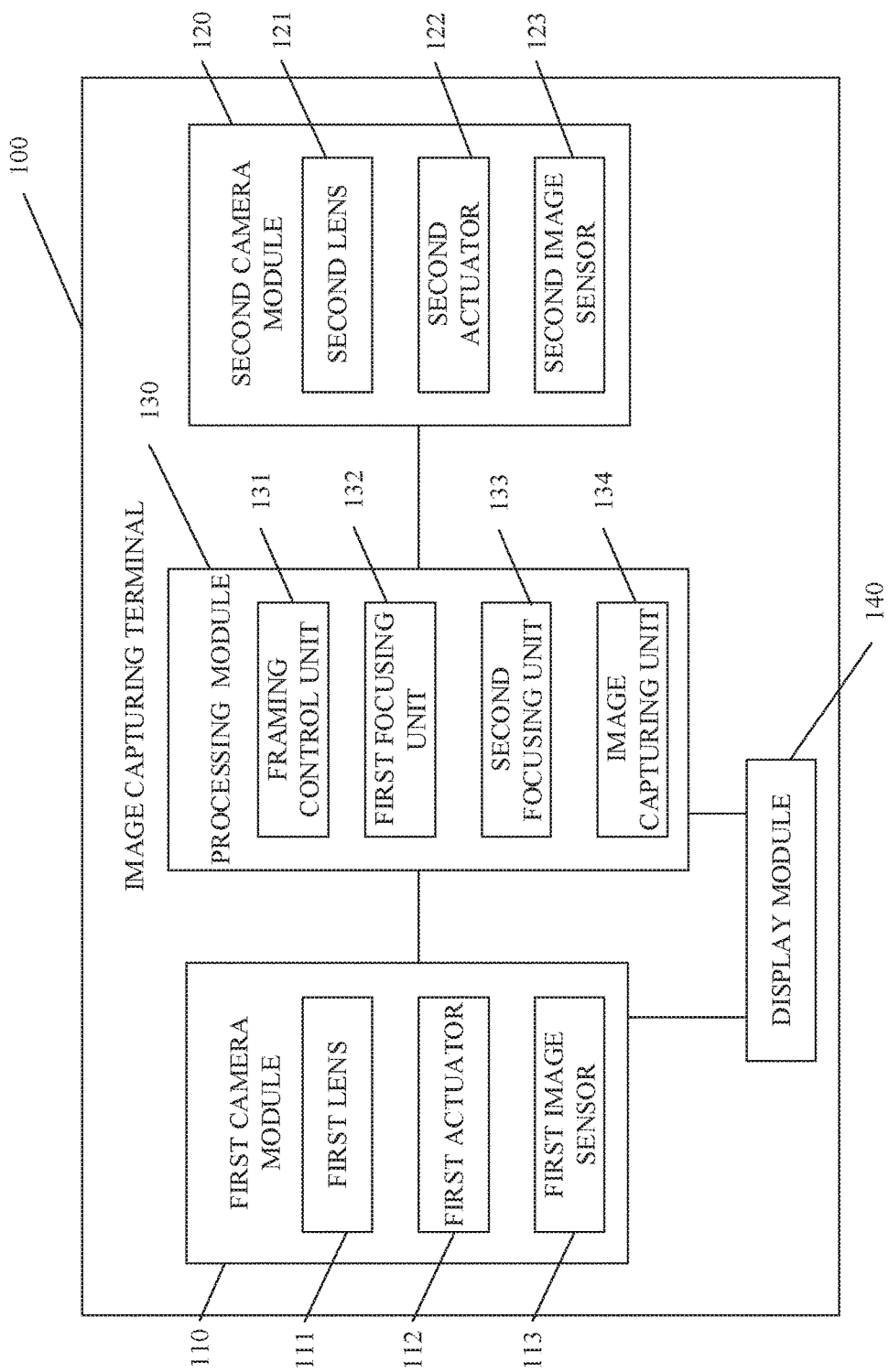
FIG. 1 is a block diagram of an image capturing terminal according to an embodiment of the present disclosure.

Referring to FIG. 1, FIG. 1 is a block diagram of an image capturing terminal 100 according to an embodiment of the present disclosure. The image capturing terminal 100 in this embodiment can be a mobile phone, a table computer, and other intelligent devices. The shooting referred in the present disclosure includes, but not limited to, taking pictures, recording video, and so on. The taking pictures is taken here as an example to describe the present disclosure. It should be understood that video can synthesized by multiple pictures according to the time order, namely, the present disclosure also applies to video shooting.

In this embodiment, the image capturing terminal 100 includes a first camera module 110, a second camera module 120, a processing module 130 and a display module 140.

In detail, the first camera module 110 and the second camera module 120 are configured to sample (e.g., taking pictures, recording video) an external scene. That is, the first camera module 110 and the second camera module 120 are used for framing the external scene. The first camera module 110 and the second camera module 120 can include the same camera lens, namely, the first camera module 110 and the second camera module 120 have the same optical coefficient, such as using the camera lenses with the same optical coefficient. In this embodiment, the first camera module 110 includes a first image sensor 113, and the second camera module 120 includes a second image sensor 123. The optical axis of the first camera module 110 is parallel to the optical axis of the second camera module 120, and the first image sensor 113 and the second image sensor 123 are located in the same plane perpendicular to the first camera module 110. In this embodiment, the first camera module 110 is the same as the second camera module 120. The first camera module 110 is configured to obtain high resolution images, which is greater than the resolution of the images outputted by the second camera module 120. The second camera module 120 is used for auxiliary focus, that is, the second camera module 120 can assist the image capturing terminal 100 to focus.

In detail, in this embodiment, the first camera module 110 includes a first lens 111, a first actuator 112 and the first image sensor 113. The first lens 111 can includes one or more than one optical lenses, which is configured to obtain optical images of a framed scene. The first image sensor 113 is configured to sense the optical images obtained by the first lens 111. The first camera module 110 is configured to shoot and frame the scene, and output the optical images sensed by the first image sensor 113 with a higher resolution. For example, the first camera module 110 can output the images with the maximum resolution, such as 20 MP. That is, the first camera module 100 can output the images with the maximum resolution that the first camera module 100 itself can output. The first actuator 112 is configured to drive the first lens 111 to move relative to the first image sensor 113 under the control the processing module 130 so as to make the first camera module 110 to automatically focus. In this embodiment, the first actuator 112 can be a voice coil motor, and can also be a closed-loop motor. Preferably, the first actuator 112 is a closed-loop motor.

In this embodiment, the second camera module 120 includes a second lens 121, a second actuator 122 and the second image sensor 123. The second lens 121 can includes one or more than one optical lenses, which are used to obtain optical images of a framed scene. The structure and the optical coefficient of the first lens 111 can be the same as the structure and the optical coefficient of the second lens 121. The second image sensor 123 is configured to sense the optical images obtained by the second lens 121. The first camera module 110 and the second camera module 120 are configured to concurrently shoot and frame the same scene, and the second camera module 120 outputs the optical images sensed by the second image sensor 123 with a lower resolution. It can be set that the resolution of the image outputted by the second image sensor 123 is less than the resolution of the image outputted by the first image sensor 113; namely, in this embodiment, the resolution of the image outputted by the first camera module 110 is greater than the resolution of the image outputted by the second camera module 120. For example, the resolution of the image outputted by the second sensor 123 can be set as 720 P or 1080 P. The second actuator 122 is configured to drive the second lens 121 to move relative to the second image sensor 123 under the control of the processing module 130, so as to make the second camera module 120 to automatically focus. The second actuator 122 is also configured to sense the position of the second lens 121, and send the position to the processing module 130 while the second lens 121 is focused on the focus. In this embodiment, the second actuator 122 can be a closed-loop motor, and the closed-loop motor can not only drive the second lens 121 to move so as to realize autofocus under the control of the processing module 130, but also sense position information corresponding to movements of the second lens 121 and send the position information to the processing module 130. In this embodiment, the resolution of the second image sensor 123 is the same as the resolution of the first image sensor 113; the second image sensor 123 can also be an image sensor whose physical resolution is less than the physical resolution of the first image sensor 113. When the resolution of an image outputted by the second image sensor 123 is 720 P, the frame rate can be 120 fps; when the resolution of an image outputted by the second image sensor 123 is 1080 P, then the frame rate can be 60 fps.

The physical resolution of the first image sensor 113 and the second image sensor 123 can be the same, and can be different from each other. Wherein, the physical resolution is the maximum resolution that an image sensor can output. When the physical resolution of the first image sensor 113 and the second image sensor 123 is the same, and the first lens 111 is the same as the second lens 121, then the position of the focus of the second camera module 120 is the same as the position of the focus of the first camera module 110, that is, the focus position of the first camera module 110 is the same as that of the second camera module 120. When located at the focus, the distance between the first lens 111 and the first image sensor 113 is equal to the distance between the second lens 121 and the second image sensor 123. When the physical resolution of the first image sensor 113 is different from the physical resolution of the second image sensor 123, when located at the focus, the distance between the first lens 111 and the first image sensor 113 is equal to the distance between the second lens 121 and the second image sensor 123. Understandably, at the time of making the first camera module 110 and the second camera module 120, each focus of the second camera module 120 can be determined by means of a detection, thus, each focus of the first camera module 110 corresponding to the focus of the second camera module 120 can be further determined. For example, as for the same scene, when the second lens 121 of the second camera module 120 is located at a focus position A, a position B of the first lens 111 of the first camera module 110 can be obtained corresponding to the focus position A by means of the detection, therefore forming a corresponding relationship between the focus position A and the position B.

The processing module 130 is configured to control the first camera module 110 and the second camera module 120 to frame concurrently the scene. The processing module 130 is further configured to control the second camera module 120 to automatically focus on a focus, and control the first actuator 112 of the first camera module 110 to drive the first lens 111 to move on the basis of focus information of the second camera module 120, and the then the first lens 111 moves to the focus under the control of the first actuator 112, making the first camera module 110 to automatically focus.

In this embodiment, the processing module 130 includes a framing control unit 131, a first focusing unit 132, a second focusing unit 133 and an image capturing unit 134.

The framing control unit 131 is configured to control the first camera module 110 and the second camera module 120 to frame concurrently the same scene.

The first focusing unit 132 is configured to control the second camera module 120 to automatically focus to find a focus. The first focusing unit 132 can automatically focus on the focus on the basis of a contrast ratio detection method. In detail, the first focusing unit 132 controls the second actuator 122 to move along the direction from a first point (such as an initial point) to a second point (an end point), and move from the end point back to the initial point. That is, within the moving range of the second actuator 122, the second actuator 122 can drive the second lens 121 to move from the nearest point to the farthest point from the second image sensor 123, and can also drive the second lens 121 to move from the farthest point from the second image sensor 123 to the nearest point. In the process of moving, the second image sensor 123 can obtain different frames of images, since the output resolution of the second image sensor 123 is low, thus the frame number is greater, namely, during a relatively short period of time, the second image sensor 123 can sense more frames of images, and the first focusing unit 132 can analyze the contrast ratios of different frames of the images sensed by the second image sensor 123. When the clearest image is obtained, the resolution of the image is maximal, at this point, the position where the second lens 121 is located corresponding to the clearest image is the focus, and the second actuator 122 senses position information of the focus. Thus, because the second camera module 120 is configured with high frame rate, so the second camera module 120 can output more frames of images within the same time, which can quickly find the focus and realize quick autofocus.

The second focusing unit 133 can control the first actuator 112 to drive the first lens 111 to move to the focus according to the position information of the focus sent by the second actuator 122, so as to make the first camera module 110 to obtain clear the images directly. Because the focus of the first camera module 110 and the focus of the second camera module 120 have the corresponding relationship, that is, the focus of the first camera module 110 corresponds to the focus of the second camera module 120, so that the second focusing unit 133 can determine the position of the focus of the first camera module 110 according to the position information of the focus of the second camera module 120, so as to directly control the first actuator 112 to drive the first lens 111 to move to the focus, therefore achieving autofocus. When the physical resolution of the first image sensor 113 is the same as the physical resolution of the second image sensor 123, and the first lens 111 is the same as the second lens 121, the position of the focus of the second camera module 120 is the same as the position of the focus of the first camera module 110. When located at the focus, the distance between the first lens 111 and the first image sensor 113 is equal to the distance between the second lens 121 and the second image sensor 123. When the physical resolution of the first image sensor 113 is different from the physical resolution of the second image sensor 123, the focus of the first camera module 110 can be determined on the basis of the corresponding relationship between each focus of the second camera module 120 and each focus of the first camera module 110.

The image capturing unit 134 is configured to obtain and capture the image outputted by the first image sensor 113 while the first camera module 120 is focused on the focus. In this embodiment, since the first image sensor 113 outputs the image with a higher resolution, so that the image obtained by the image capturing unit 134 has a high resolution.

The display module 140 is configured to display the image obtained by the image capturing unit 134.

Furthermore, the image capturing terminal 100 can further includes a storage element, which is configured to store the image obtained by the image capturing unit 134.

Understandably, there is a certain distance between the first camera module 110 and the second camera module 120 that could lead to a position deviation between the image obtained by the first camera module 110 and the image obtained by the second camera module 120. The processing module 130 can further include a compensation unit (such as, a compensation circuit), and the compensation unit is configured to adjust the image outputted by the second camera module 120 according to the distance between the first camera module 110 and the second camera module 120, so as to make the second camera module 120 to output the images consistent with the images outputted by the first camera module 110.

The image capturing terminal 100 provided in the present disclosure includes: a first camera module 110 and a second camera module 120, and the resolution of the image outputted by the first camera module 110 is greater than the resolution of the image outputted by the second camera module 120. Since the second camera module 120 outputs the image using a lower resolution, thus the second camera module 120 has a high frame rate. When contrast ratio detection based on frame difference is used to achieve autofocus, the second camera module 120 can find the focus in the condition of a higher frame rate, compared with the first camera module 110 outputting the image with high resolution for autofocus, which can improve the speed of focus. The first camera module 110 can directly realize autofocus on the basis of the focus information of the second camera module 120. Thus, the image capturing terminal 100 in this embodiment can quickly obtain and capture the focus through the second camera module 120, and output the images with a higher resolution through the first camera module 110, which can guarantee the output of high resolution images, and have a shorter autofocus time at the same time, thereby improving the speed of autofocus and enhancing the user experience.

Figure 2:
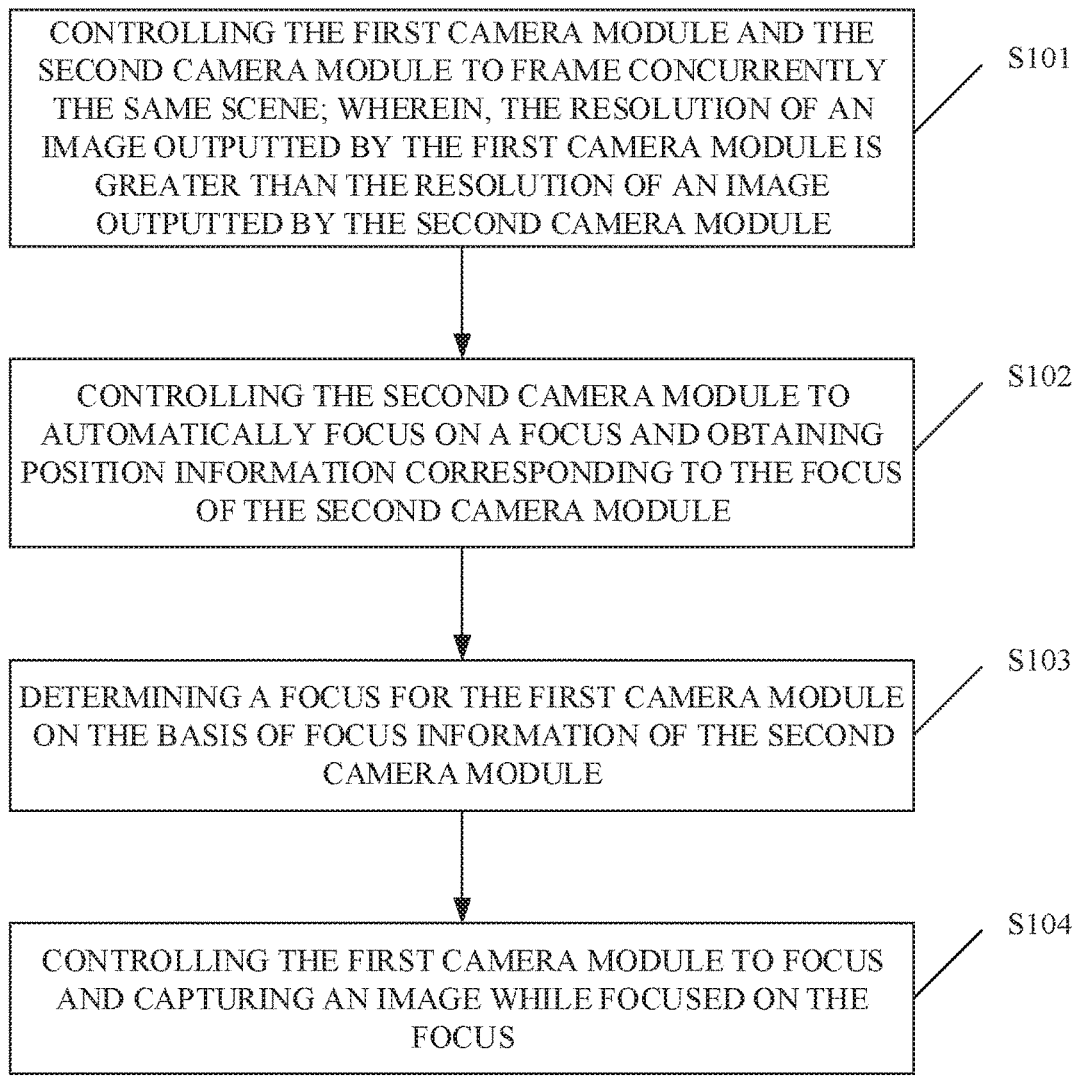
FIG. 2 is a flowchart of an image capturing method according to an embodiment of the present disclosure.

Referring to FIG. 2, FIG. 2 is a flowchart of an image capturing method according to an embodiment of the present disclosure, and the image capturing method can be realized and implemented by the image capturing terminal 100 as shown in FIG. 1. The image capturing method at least includes the following steps.

Step S101, controlling a first camera module 110 and a second camera module 120 to frame concurrently the same scene; wherein, the resolution of an image outputted by the first camera module 110 is greater than the resolution of an image outputted by the second camera module 120.

In detail, a processing module 130 of the image capturing terminal 100 is used to control the first camera module 110 and the second camera module 120 to frame concurrently the same scene. In this embodiment, the optical axis of the first camera module 110 is parallel to the optical axis of the second camera module 120, and a first image sensor 113 and a second image sensor 123 are located in the same plane perpendicular to the first camera module 110. A first lens 111 of the first camera module 110 and a second lens 121 of the second camera module 120 have the same optical coefficient.

Step S102, controlling the second camera module 120 to automatically focus on a focus and obtaining position information corresponding to the focus of the second camera module 120.

In this embodiment, the processing module 130 controls a second actuator 122 of the image capturing terminal 100 to drive the second lens 121 to move, and analyzes the contrast ratios of different frames of images obtained by the second image sensor 123, and determines the focus on the basis of an analysis result of the contrast rations, and obtains the position information corresponding to the focus of the second camera module 120.

In detail, a first focusing unit 132 of the processing module 130 controls the second actuator 122 to move along the direction from an initial point to an end point, and move from the end point back to the initial point. That is, within the moving range of the second actuator 122, the second actuator 122 can drive the second lens 121 to move from the nearest point to the farthest point from the second image sensor 123, and can also drive the second lens 121 to move from the farthest point from the second image sensor 123 to the nearest point. In the process of moving, the second image sensor 123 can obtain different frames of images, since the output resolution of the second image sensor 123 is low, thus the frame number is greater, namely, during a relatively short period of time, the second image sensor 123 can sense more frames of images, and can make the second lens 121 to move faster. The first focusing unit 132 can analyze the contrast ratios of different frames of the images sensed by the second image sensor 123. When the clearest image is obtained, the resolution of the image is maximal, at this point, the position where the second lens 121 is located corresponding to the clearest image is the focus, and the second actuator 122 senses position information of the focus. Thus, because the second camera module 120 is configured with high frame rate, so the second camera module 120 can output more frames of images within the same time, which can quickly find the focus and realize quick autofocus.

Step S103, determining a focus for the first camera module 110 on the basis of focus information of the second camera module 120.

In detail, a second focusing unit 133 of the processing module 130 can control the first actuator 112 to drive the first lens 111 to move to the focus according to the position information of the focus sent by the second actuator 122, and on the basis of the focus information of the second camera module 120 and the corresponding relationship between the focus of the first camera module 110 and the focus of the second camera module 120.

Step S104, controlling the first camera module 110 to focus and capturing an image while the first camera module 110 is focused on the focus.

The first camera module 110 can output images using high resolution, that is, the first camera module 110 can employ high resolution for outputting the images, which thereby can guarantee that the resolution of outputted images meets the requirements.

Understandably, when a user replaces current scene with other scenes, then high resolution images of different scenes can be obtained by just repeating the step S102 to the step S104.

The image capturing method provided in the present disclosure employs a first camera module 110 and a second camera module 120 to frame concurrently the same scene; the resolution of the image outputted by the first camera module 110 is greater than the resolution of the image outputted by the second camera module 120. Because the second camera module 120 outputs the image using a lower resolution, thus the second camera module 120 has a high frame rate. When contrast ratio detection based on frame difference is used to achieve autofocus, the second camera module 120 can find the focus in the condition of a higher frame rate, compared with the first camera module 110 outputting the image with high resolution for autofocus, which can improve the speed of focus. The first camera module 110 can directly realize autofocus on the basis of the focus information of the second camera module 120. Thus, the image capturing method in this embodiment can quickly obtain and capture the focus through the second camera module 120, and output the images with a higher resolution through the first camera module 110, which can guarantee the output of high resolution images, and have a shorter autofocus time at the same time, thereby improving the speed of autofocus and enhancing the user experience.

While the present invention has been described with reference to particular embodiments, it will be understood that the embodiments are illustrative and that the invention scope is not so limited. Alternative embodiments of the present invention will become apparent to those having ordinary skill in the art to which the present invention pertains. Such alternate embodiments are considered to be encompassed within the spirit and scope of the present invention.

What is claimed is:

1. A terminal for image capturing, comprising:
    a first camera module;
    a second camera module, wherein the first camera module and the second camera module are configured to frame concurrently the same scene, wherein a second frame rate of a second image outputted by the second camera module is greater than a first frame rate of a first image outputted by the first camera module;
    a processing module, wherein the processing module is configured to:
        based on detecting and analyzing contrast ratios of different frames of images taken by the second camera module from multiple focal positions, control the second camera module to autofocus on a second focus of the second camera module; and
        based directly on focal information of the second focus, determine a first focus for the first camera module and control the first camera module to focus directly based on the first focus for capturing an image while focused on the first focus.

2. The terminal of claim 1, wherein the second camera module comprises a second lens, a second actuator, and a second image sensor, wherein the second actuator is configured to drive the second lens to move relative to the second image sensor to realize autofocus under control of the processing module.

3. The terminal of claim 2, wherein the first camera module comprises a first lens, a first actuator, and a first image sensor, and wherein the processing module is configured to control the first actuator to directly drive the first lens to move to the first focus according to position information of the second focus of the second camera module.

4. The terminal of claim 3, wherein the first lens is the same as the second lens, and the first image sensor is the same as the second image sensor.

5. The terminal of claim 4, wherein when the first lens is located at the first focus and the second lens is located at the second focus, a first distance between the first lens and the first image sensor is equal to a second distance between the second lens and the second image sensor.

6. The terminal of claim 3, wherein the first lens is the same as the second lens and first physical resolution of the first image sensor is greater than second physical resolution of the second image sensor.

7. The terminal of claim 6, wherein each focus of the first camera module corresponds to the second focus of the second camera module, and the first focus of the first camera module is determined according to the second focus of the second camera module and a corresponding relationship between the first focus of the first camera module and the second focus of the second camera module.

8. The terminal of claim 3, wherein the second actuator is a closed-loop motor, and the second actuator is further configured to sense the position information of the second focus of the second camera module and send the position information of the second focus to the processing module.

9. The terminal of claim 3, wherein the first actuator is a closed-loop motor or a voice coil motor.

10. The terminal of claim 1, wherein a a first resolution of the first image is greater than a second resolution of the second image.

11. A method for image capturing for an image capturing terminal comprising a first camera module, a second camera module, and a processing module, the method comprising:
    controlling the first camera module and the second camera module to frame concurrently the same scene, wherein first resolution of a first image outputted by the first camera module is greater than second resolution of a second image outputted by the second camera module and a second frame rate of the second image is greater than a first frame rate of the first image;
    analyzing different frames of images taken by the second camera module from focal positions to determine a frame having an optimal image;
    based on position information of the second camera module for the frame having the optimal image, determining a second focus for the second camera module;
    based on the second focus for the second camera module, determining a first focus for the first camera module; and
    controlling the first camera module to focus on the first focus for capturing an image while focused on the first focus.

12. The method of claim 11, wherein the second camera module comprises a second lens, a second actuator, and a second image sensor, wherein the second actuator is configured to drive the second lens to move relative to the second image sensor to realize autofocus under control of the processing module.

13. The method of claim 12, wherein the first camera module comprises a first lens, a first actuator, and a first image sensor, wherein the processing module is configured to control the first actuator to directly drive the first lens to move to the first focus according to the position information of the second camera module.

14. The method of claim 13, wherein the first lens is the same as the second lens and the first image sensor is the same as the second image sensor.

15. The method of claim 14, wherein when the first lens is located at the first focus and the second lens is located at the second focus, a first distance between the first lens and the first image sensor is equal to a second distance between the second lens and the second image sensor.

16. The method of claim 13, wherein the first lens is the same as the second lens, and first physical resolution of the first image sensor is greater than second physical resolution of the second image sensor.

17. The method of claim 16, wherein the first focus of the first camera module corresponds to the second focus of the second camera module, and the first focus of the first camera module is determined according to the second focus of the second camera module and a corresponding relationship between the first focus of the first camera module and the second focus of the second camera module.

18. The method of claim 13, wherein the second actuator is a closed-loop motor, and the second actuator is further configured to sense the position information of the second focus of the second camera module and send the position information of the second focus to the processing module.

19. The method of claim 13, wherein the first actuator is a closed-loop motor or a voice coil motor.

\* \* \* \* \*